United States Patent [19]

Latouche

[11] Patent Number: 5,370,409
[45] Date of Patent: Dec. 6, 1994

[54] TOWABLE MOBILE FLUID CARRIER

[76] Inventor: Paul J. Latouche, P.O. Box 18395, West Palm Beach, Fla. 33416

[21] Appl. No.: 47,140

[22] Filed: Apr. 13, 1993

[51] Int. Cl.$^5$ ............................. B62B 1/12; B62B 1/16
[52] U.S. Cl. ............................... 280/47.26; 280/47.33; 220/761; 220/770; 16/115
[58] Field of Search ............ 280/47.26, 47.315, 47.33, 280/63, 79.2, 655, 655.1; 220/571, 757, 761, 767, 770, DIG. 6; 16/110.5, 115; 190/18 A

[56] References Cited

U.S. PATENT DOCUMENTS

| | | | |
|---|---|---|---|
| 3,606,372 | 9/1971 | Browning | 16/115 X |
| 4,253,716 | 3/1981 | Turner, Jr. | 312/100 |
| 4,256,320 | 3/1981 | Hager | 190/18 A X |
| 4,261,447 | 4/1981 | Arias et al. | 190/18 A |
| 4,327,849 | 5/1982 | Sharpton | 224/42.03 A |
| 4,424,999 | 1/1984 | Commins | 294/142 |
| 4,440,410 | 4/1984 | Bradshaw | 280/47.26 |
| 4,550,931 | 11/1985 | Ziaylek, Jr. | 280/47.26 X |
| 4,743,038 | 5/1988 | Myers et al. | 280/40 |
| 4,778,191 | 10/1988 | Heisson | 280/47.26 |
| 5,048,649 | 9/1991 | Carpenter et al. | 190/18 A |
| 5,139,278 | 8/1992 | Vlasicak | 280/47.26 |
| 5,249,438 | 10/1993 | Rhaney et al. | 280/47.26 X |

*Primary Examiner*—Brian L. Johnson
*Attorney, Agent, or Firm*—John R. Flanagan

[57] ABSTRACT

A towable mobile fluid carrier includes a hollow container body having an interior cavity for containing fluid and a recessed region in the lower middle portion thereof, a vent mouth and cap on the container body, a fill and pour mouth and closure on the container body spaced from the vent mouth and cap, a telescoping handle mounted to the container body, and a carriage assembly connected to and movably supporting the container body and being disposed within the recessed region of the container body. The telescoping handle includes a hollow main pipe mounted to the container body and extending from the lower recessed region through the interior cavity to above the middle of the container body, a plurality of auxiliary telescoping pipes slidably inserted into the main pipe, and a handgrip mounted on an end of an inner one of the auxiliary pipes. The carriage assembly has an axle mounted in the recessed region to the container body and a pair of wheels mounted to opposite ends of the axle for undergoing rotation and moving the container body when pulled by the handle.

18 Claims, 1 Drawing Sheet

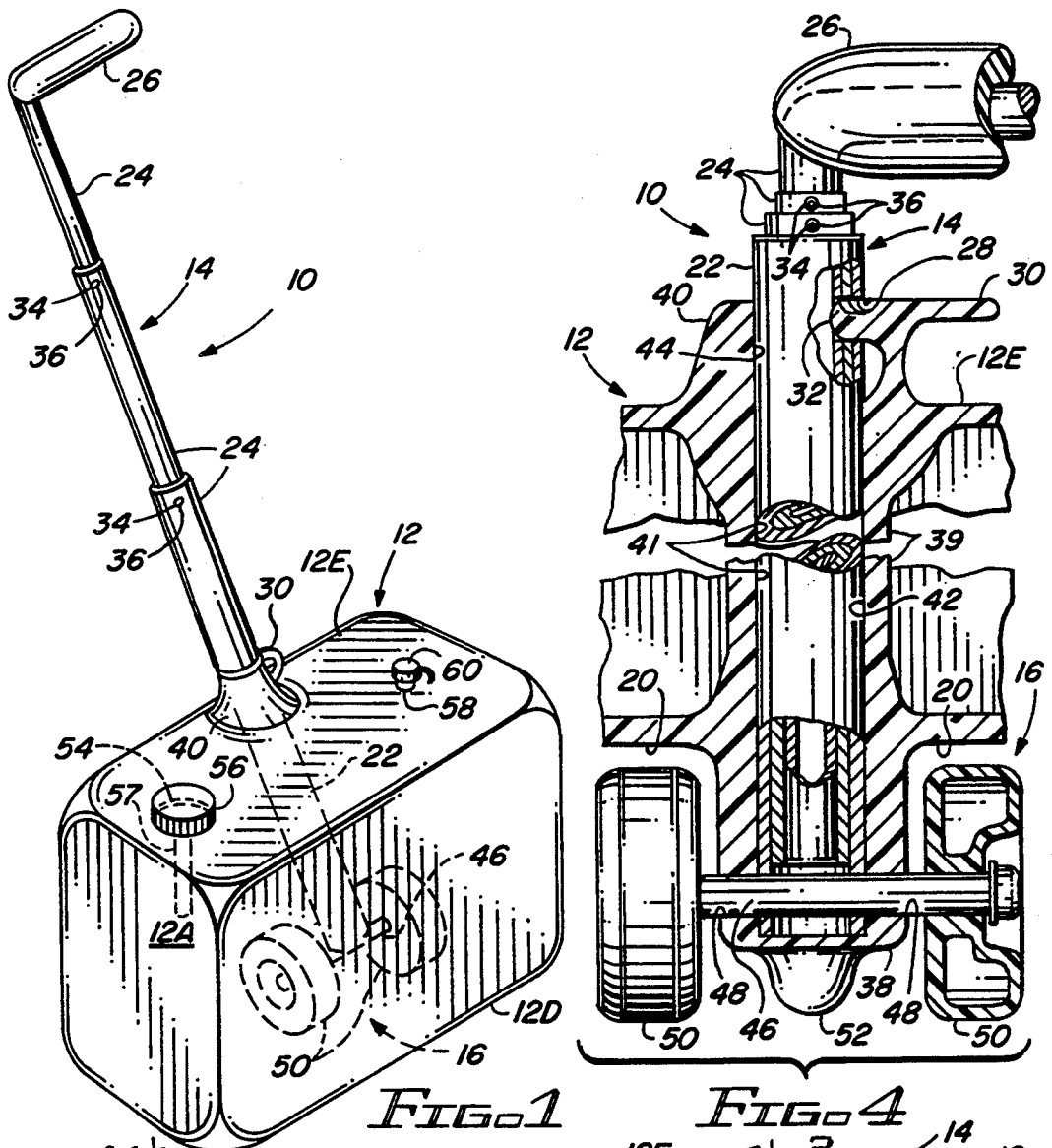

TOWABLE MOBILE FLUID CARRIER

BACKGROUND OF THE INVENTION

1. Field of the Invention

The present invention generally relates to carriers for containing fluids, such as gasoline and other fluid fuels, and, more particularly, is concerned with a towable mobile fluid carrier.

2. Description of the Prior Art

Most motorists, due to inattention or various other reasons, from time to time run out of fuel. Usually this happens at remote locations not close to a fuel filling station, leaving the motorist stranded. The stranded motorist must then either flag down another passing vehicle, walk a considerable distance to find a filling station or locate a telephone to call for emergency assistance to obtain a small quantity of fuel sufficient to refuel the vehicle and reach a filling station. It would be highly desirable to have a portable fuel container convenient to use in transporting such small quantity of fuel for this purpose.

There are other occasions when it would also be highly desirable to have a portable fuel container which is easy to handle and transport. An example of one such occasion is a trip to the local fuel filling station to purchase a gallon or so of fuel to use to operate fuel-powered lawnmowers and garden equipment. A portable fuel container that need not be carried is especially desirable for use by persons of inadequate strength to carry heavy objects, such as senior citizens. Thus, a need exists for such a portable fuel container.

SUMMARY OF THE INVENTION

The present invention provides a towable mobile fluid carrier designed to satisfy the aforementioned need. Although the towable mobile fluid carrier of the present invention is suited for use in containing and transporting fluid fuels, such as gasoline, it is equally suited for use in containing and transporting other types of fluids, such as ordinary water. Thus, the type of fluid carried is not a limitation of the present invention. The carrier of the present invention is compact and thus can be readily stored in a small space in a vehicle. The carrier is also lightweight and so can be carried like a briefcase or pulled like a cart.

Accordingly, the present invention is directed to a towable mobile carrier for containing fluids, such as a fluid fuel. The towable carrier comprises: (a) a hollow container body with an interior cavity for containing a fluid and a recessed region in the lower middle portion of the container body; (b) means on the container body for permitting fluid flow communication into and from the interior cavity of the container body; (c) an elongated handle mounted to the container body, the handle extending from the lower recessed region through the interior cavity to above the container body; and (d) means connected to the container body for movably supporting the container body, the supporting means being disposed within the lower recessed region of the container body and projecting below the container body.

More particularly, the fluid flow communication means includes a fill and pour mouth attached on the body and a mouth closure releasably secured to the fill and pour mouth for sealing access into the container body through the fill and pour mouth. The fluid flow commuication means also includes a vent mouth attached on the container body spaced from the fill and pour mouth and a vent cap releasably secured to the vent mouth for sealing access into the container body through the vent mouth.

Further, the handle includes a hollow main pipe and at least one and preferably a pair of auxiliary pipes slidably inserted into the main pipe for telescoping movement relative thereto and a handgrip on an outer end of one of the auxiliary pipes. Also, the supporting means is a carriage assembly having an axle rotatably mounted to the container body and extending into the lower recessed region thereof and a pair of wheels mounted to opposite ends of the axle for moving the container body when pulled by the handle.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a towable mobile fuel carrier of the present invention.

FIG. 2 is a front elevational view of the mobile carrier of FIG. 1.

FIG. 3 is a vertical cross-sectional view of the mobile carrier taken along line 3—3 of FIG. 2.

FIG. 4 is an enlarged foreshortened longitudinal vertical sectional view of a telescoping handle and carriage assembly of the mobile carrier taken along line 4—4 of FIG. 3.

DETAILED DESCRIPTION OF THE INVENTION

Referring to the drawings and particularly to FIGS. 1 to 3, there is illustrated a towable mobile carrier, generally designated 10, of the present invention for containing fluids, such as gasoline and other fluid fuels. Basically, the towable mobile carrier 10 includes a hollow container body 12, an elongated handle 14, and a carriage assembly 16 supporting the container body 12 for movement when pulled by the handle 14. The container body 12 is fabricated in any suitable matter from a suitable material, such as by conventional techniques of blow molding plastic material. The container body 12 is so fabricated to have an interior cavity 18 formed by a pair of opposing side walls 12A, 12B, a pair of opposing front and rear walls 12C, 12D extending between and interconnecting the side walls 12A, 12B, and a pair of opposing top and bottom walls 12E, 12F extending between and interconnecting the side, front and rear walls 12A, 12B, 12C, 12D. The interior cavity 18 can contain a desired fluid. Also, a recessed region 20 is formed into the lower middle portion of the container body 12, specifically defined in the front wall 12C and bottom wall 12F thereof so as to, in effect, protrude upwardly into the interior cavity 18.

Referring to FIGS. 1, 2 and 4, the elongated handle 14 is mounted to the container body 12. The handle 14 extends in alignment with and from the lower recessed region 20 through the interior cavity 18 to above the container body 12. The handle 14 includes an elongated hollow main pipe 22 and at least one and preferably a plurality of auxiliary pipes 24 slidably inserted into the main pipe 22 for telescoping movement relative thereto and relative to one another. The pipes 22, 24 are preferably of cylindrical configurations and fabricated from suitable plastic or metal materials. The handle 14 also includes a handgrip 26 attached on an outer end of an innermost one of the auxiliary pipes 24.

The auxiliary pipes 24 telescopically slide relative to one another and to the main pipe 22 between a fully extended position as shown in FIG. 1 and a fully retracted position as shown in FIGS. 2 to 4. As best seen in FIG. 4, the pipes 22, 24 below their respective upper ends have respective apertures 28 which are aligned with one another when the pipes are in the fully retracted position. Also, a flexible latch member 30 is mounted on the container body 12 adjacent to the retracted upper ends of the pipes 22, 24 so as to normally assume a latched relationship with the pipes in which a head 32 on the latch member 30 extends through the aligned apertures 28 so as to maintain the pipes 22, 24 of the handle 14 in the fully retracted position so that the handgrip 26 of the handle 14 can be used to carry the carrier 10 instead of pulling it. Also, above their respective lower ends, the auxiliary pipes 24 have respective push button detent locking devices 34 which align with and protrude into holes 36 in the overlapped portions of the adjacent pipes 22, 24 for releasably locking the auxiliary pipes 24 in fully extended position, as seen in FIG. 1.

Referring to FIG. 4, the container body 12 also includes a pair of lower and upper annular portions 38, 40 and an elongated main tubular portion 39 connected to and extending between the lower and upper annular portions 38, 40. The lower annular portion 38 is formed on the container body 12 so as to protrude into the recessed region 20 of the container body 12. The lower annular portion 38 has a central passage 42 which is closed at the bottom end and open at the top end. The upper annular portion 40 is formed on the container body 12 above and opposite from and in alignment with the lower annular portion 38. The upper annular portions 40 also has a central passage 44 open at its opposite ends and aligned with the central passage 42 of the lower annular portion 38. The main tubular portion 39 is integrally formed with the lower and upper annular portions 38, 40 and extends through and across the interior cavity 18 of the container body 12. The main tubular portion 39 of the container body 12 has a central passage 41 communicating and aligned with the central passages 42, 44 of the lower and upper annular portions 38, 40. The main pipe 22 of the handle 14 is inserted through the central passages 41, 44 of the main tubular portion 39 and upper annular portion 40 of the container body 12 and into the central passage 42 of the lower annular portion 38 thereof. The integral attachment of the lower and upper annular portions 38, 40 and main tubular portion 39 with the remainder of the container body 12 prevents leakage of fluid from the interior cavity 18 of the container body 12 through the passages 41, 42 and 44 and prevents contact of the main pipe 22 of the handle 14 with the fluid in the interior cavity 18 of the container body 12. The main pipe 22 can be secured to the lower and upper annular portions 38, 40 of the container body 12 in any suitable manner, such as by a press fit or by application of a suitable adhesive.

Referring to FIGS. 1 to 4, the carriage assembly 16 of the carrier 10 is disposed within the recessed region 20 of the container body 12 and projects below the container body 12. The carriage assembly 16 has an elongated axle 46 mounted to the container body 12 through a pair of aligned openings 48 formed in the lower end of the lower annular portion 38 of the container body 12 below the lower end of the main pipe 22 of the handle 14. Thus, the axle 46 is totally disposed in the recessed region 20 of the front and bottom walls 12C, 12F of the container body 12. The carriage assembly 16 also has a pair of wheels 50 mounted to the opposite ends of the axle 46 for undergoing rotation and thereby moving the container body 12 when pulled by the handle 14. The wheels 50 project below the plan of the bottom wall 12F of the container body 12. A dimple 52 formed in the bottom wall 12F of the container body spaced rearwardly from the wheels 50 projects approximately the same distance below the bottom wall 12F as the wheels 50 and together therewith stationarily support the container body 12 upright above a support surface S. The lower and upper annular portions 38, 40 and thus the handle 14 are oriented along a line disposed at a small angle with the vertical when the container body 12 is disposed in a stationary upright rest position as shown in FIG. 4. Alternatively, the lower and upper annular portions 38, 40 could be provided at some other angle to the vertical or parallel to the vertical. The angle shown in FIG. 4 will permit most of the weight of the fluid contained in the container body 12 to be balanced over the wheels 50 so that most of the weight will be equally distributed fore-and-aft relative to the wheels 50 and thereby reduce the work load imposed on the user pulling the mobile carrier 10.

Referring to FIGS. 1 to 3, the carrier 10 further includes means on the container body 12 for permitting fluid flow communication into and from the interior cavity 18 of the container body 12. More particularly, the fluid flow communication means includes a fill and pour mouth 54 attached or formed on the container body 12 and a fill and pour mouth closure 56 releasably secured to the fill and pour mouth 54 for sealing access into the container body 12 through the fill and pour mouth 54. The fill and pour mouth 54 and closure 56 are respectively externally and internally threaded for making a threaded connection with one another. Also, a spout 57 is provided which is removably mounted to the closure 56 and reversible between an external pour position and an internal storage position.

The fluid flow communication means also includes a vent mouth 58 attached or formed on the container body 12 and spaced from the fill and pour mouth 54, and a vent mouth cap 60 releasably secured to the vent mouth 58 for sealing access into the container body 12 through the vent mouth 58. The vent mouth 58 and vent mouth cap 60 are respectively externally and internally threaded for making a threaded connection with one another.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A towable mobile carrier for containing a fluid, said carrier comprising:

(a) a hollow container body having an interior cavity for containing a fluid, said container body also having a top wall and a bottom wall disposed below and opposite from said top wall and a lower recessed region formed in a middle portion of said bottom wall of said container body so as to protrude upwardly into said interior cavity thereof;

(b) means on said container body for permitting fluid flow communication into and from said interior cavity of said container body;

(c) an elongated handle mounted to said container body, said handle extending in alignment with and from said lower recessed region through said interior cavity to above said container body; and (d) means connected to said container body for movably supporting said container body, said supporting means being disposed within said lower recessed region of said container body and projecting below said container body.

2. The carrier of claim 1 wherein said fluid flow communication means includes a fill and pour mouth attached on said container body and a fill and pour mouth closure releasably secured to said fill and pour mouth for sealing access into said container body through said fill and pour mouth.

3. The carrier of claim 2 wherein said fluid flow communication means also includes a vent mouth attached on said container body spaced from said fill and pour mouth and a vent mouth cap releasably secured to said vent mouth for sealing access into said container body through said vent mouth.

4. The carrier of claim 1 wherein said handle includes a hollow main pipe and at least one auxiliary pipe slidably inserted into said main pipe for telescoping movement relative thereto.

5. The carrier of claim 4 wherein said handle also includes a handgrip on an outer end of said auxiliary pipe.

6. The carrier of claim 4 wherein said main and auxiliary pipes of said handle have upper ends with respective apertures formed therethrough being aligned with one another when said auxiliary pipe is in a retracted position relative to said main pipe, said container body also including a flexible latch member mounted adjacent to said upper ends of said pipes so as to assume a latched relationship with said pipes in which a head portion of said latch member extends through said aligned apertures so as to maintain said auxiliary pipe in said retracted position.

7. The carrier of claim 1 wherein said supporting means is a carriage assembly having an axle mounted to said container body and extending into said lower recessed region thereof and a pair of wheels mounted to opposite ends of said axle for undergoing rotation and moving said container body when pulled by said handle.

8. A towable mobile carrier for containing a fluid, said carrier comprising:

(a) a hollow container body having an interior cavity for containing a fluid, said container body also having a top wall and a bottom wall disposed opposite from and below said top wall and a lower recessed region formed in a middle portion of said bottom wall of said container body;

(b) means on said container body for permitting fluid flow communication into and from said interior cavity of said container body;

(c) an elongated handle mounted to said container body, said handle extending from said lower recessed region through said interior cavity to above said container body; and (d) means connected to said container body for movably supporting said container body, said supporting means being disposed within said lower recessed region of said container body and projecting below said container body;

(e) said container body including a pair of annular portions and an elongated main tubular portion connected to and extending between said annular portions, a first of said annular portions being formed on said container body in said lower recessed region of said container body and a second of said annular portions being formed on said container body opposite from and aligned with said first annular portion such that said main tubular portion extends through and across said interior cavity of said container, said first and second annular portions and said main tubular portion having central passages being aligned with one another and receiving a portion of said handle therethrough.

9. The carrier of claim 8 wherein said supporting means is a carriage assembly having an axle disposed in said lower recessed region and mounted to said first annular portion of said container body and a pair of wheels mounted to opposite ends of said axle for undergoing rotation and moving said container body when pulled by said handle.

10. A towable mobile carrier for containing fluids such as a fluid fuel, said carrier comprising:

(a) a hollow container body having an interior cavity for containing a fluid, said container body also having a top wall and a bottom wall disposed opposite from and below said top wall and a lower recessed region formed in a middle portion of said bottom wall of said container body;

(b) means on said container body for permitting fluid flow communication into and from said interior cavity of said container body;

(c) towing means mounted to said container body and aligned with said lower recessed region in said bottom wall thereof and having a lower end portion disposed in said lower recessed region in said bottom wall thereof, said towing means extending from said container body for permitting pulling of said container body; and (d) a carriage assembly connected to said container body for movably supporting said container body, said carriage assembly being disposed within said lower recessed region of said container body and projecting below said container body, said carriage assembly having an axle mounted to said lower end portion of said towing means and extending into said lower recessed region in said bottom wall of said container body and a pair of wheels disposed in said lower recessed region in said bottom wall thereof and mounted to opposite ends of said axle and on opposite sides of said lower end portion of said towing means for undergoing rotation and moving said container body when pulled by said towing means.

11. The carrier of claim 10 wherein said fluid flow communication means includes a fill and pour mouth attached on said container body and a fill and pour mouth closure releasably secured to said fill and pour mouth for sealing access into said container body through said fill and pour mouth.

12. The carrier of claim 10 wherein said fluid flow commuication means also includes a vent mouth attached on said container body spaced from said fill and pour mouth and a vent mouth cap releasably secured to said vent mouth for sealing access into said container body through said vent mouth.

13. The carrier of claim 10 wherein said pulling means is an elongated handle mounted to said container body, said handle extending from said lower recessed region through said interior cavity to above said container body.

14. The carrier of claim 13 wherein said handle includes a hollow main pipe and at least one auxiliary pipe slidably inserted into said main pipe for telescoping movement relative thereto.

15. The carrier of claim 14 wherein said handle also includes a handgrip on an outer end of said auxiliary pipe.

16. The carrier of claim 14 wherein said main and auxiliary pipes of said handle have upper ends with respective apertures formed therethrough being aligned with one another when said auxiliary pipe is in a retracted position relative to said main pipe, said container body also including a flexible latch member mounted adjacent to said upper ends of said pipes so as to assume a latched relationship with said pipes in which a head portion of said latch member extends through said aligned apertures so as to maintain said auxiliary pipe in said retracted position.

17. A towable mobile carrier for containing a fluid, said carrier comprising:
(a) a hollow container body having an interior cavity for containing a fluid, said container body also having a top wall and a bottom wall disposed opposite from and below said top wall and a lower recessed region formed in a middle portion of said bottom wall of said container body;
(b) means on said container body for permitting fluid flow communication into and from said interior cavity of said container body;
(c) means mounted to said container body for permitting pulling of said container body; and
(d) a carriage assembly connected to said container body for movably supporting said container body, said carriage assembly being disposed within said recessed region of said container body and projecting below said container body, said carriage assembly having an axle mounted to said container body and extending into said recessed region thereof and a pair of wheels mounted to opposite ends of said axle for undergoing rotation and moving said container body when pulled by said pulling means;
(e) said pulling means including an elongated handle mounted to said container body, said handle extending from said lower recessed region through said interior cavity to above said container body, said handle including a hollow main pipe and at least one auxiliary pipe slidably inserted into said main pipe for telescoping movement relative thereto;
(f) said container body including a pair of annular portions and an elongated main tubular portion connected to and extending between said annular portions, a first of said annular portions being formed on said container body in said recessed region of said container body and a second of said annular portions being formed on said container body opposite from and aligned with said first annular portion such that said main tubular portion extends through and across said interior cavity of said container, said first and second annular portions and said main tubular portion having central passages being aligned with one another and receiving throughthrough said main pipe of said handle.

18. The carrier of claim 17 wherein said axle of said carriage assembly is mounted through said second annular portion on said container body.

* * * * *